United States Patent
Ganguli et al.

[11] Patent Number: 5,976,595
[45] Date of Patent: Nov. 2, 1999

[54] FLAVORING OF EDIBLE OILS

[75] Inventors: Keshab L. Ganguli, Bleiswijk; Anton R. van Immerseel, Vlaardingen, both of Netherlands; George C. Michaelides, Athens, Greece; Karel P. van Putte, Maasland; Hessel Turksma, Delft, both of Netherlands

[73] Assignee: Unilever Patent Holdings, Vlaardingen, Netherlands

[21] Appl. No.: 08/983,249
[22] PCT Filed: Jun. 26, 1996
[86] PCT No.: PCT/EP96/02844
   § 371 Date: Apr. 20, 1998
   § 102(e) Date: Apr. 20, 1998
[87] PCT Pub. No.: WO97/03566
   PCT Pub. Date: Feb. 6, 1997

[30] Foreign Application Priority Data

Jul. 20, 1995 [EP] European Pat. Off. ............. 95202000

[51] Int. Cl.⁶ ..................................................... A23D 9/02
[52] U.S. Cl. ........................... 426/417; 426/429; 426/494; 426/533; 426/601; 554/8; 554/9; 554/12; 554/15
[58] Field of Search .................... 426/533, 650, 426/425, 534, 655, 429, 478, 486, 487, 488, 490, 492, 493, 494, 601, 417; 554/8, 9, 12, 15, 17, 20, 23

[56] References Cited

U.S. PATENT DOCUMENTS

| | | |
|---|---|---|
| 1,371,342 | 3/1921 | Bollmann . |
| 4,093,565 | 6/1978 | Steltenkamp .......................... 426/533 |
| 4,250,199 | 2/1981 | Underwood ........................... 426/533 |
| 4,352,746 | 10/1982 | Bracco ................................. 426/429 |
| 4,504,503 | 3/1985 | Bernoth ............................... 426/312 |
| 4,571,342 | 2/1986 | De Cecca ............................ 426/533 |
| 4,604,290 | 8/1986 | Lee ...................................... 426/533 |
| 4,820,538 | 4/1989 | Schulman ............................ 426/533 |
| 4,865,868 | 9/1989 | Kuss .................................... 426/533 |
| 5,043,180 | 8/1991 | Haring ................................. 426/533 |
| 5,079,017 | 1/1992 | Chen ................................... 426/533 |
| 5,084,292 | 1/1992 | Van Dort ............................. 426/533 |
| 5,104,672 | 4/1992 | Chen ................................... 426/533 |
| 5,130,157 | 7/1992 | Hulsker ............................... 426/492 |
| 5,271,949 | 12/1993 | Haring ................................. 426/533 |
| 5,496,579 | 3/1996 | Weigandt ............................. 426/533 |
| 5,811,149 | 9/1998 | Chen ................................... 426/312 |

FOREIGN PATENT DOCUMENTS

| | | | |
|---|---|---|---|
| 0 475 573 A1 | 3/1992 | European Pat. Off. ......... | A23D 9/00 |
| 0 545 292 A2 | 6/1993 | European Pat. Off. ......... | C11B 3/00 |
| 0 600 539 A1 | 6/1994 | European Pat. Off. ......... | C11B 3/00 |
| 1 929 059 | 12/1969 | Germany . | |
| 2338090 | 7/1973 | Germany ............................. | 426/533 |
| 2353970 | 10/1973 | Germany ............................. | 426/533 |
| WO 93/06749 | 4/1993 | WIPO ............................ | A23L 1/24 |
| WO 94/15479 | 7/1994 | WIPO ............................ | A23D 9/00 |

OTHER PUBLICATIONS

Meroy 1968 Food Flavorings 2nd edition AVI Publishing Co. Westport, CT pp. 256–259, 273–276, 340–341, 354, 370–373.

Patent Abstract of Japan, Publication No. JP 2132538.

Derwent Abstract Nos. J01020294; J08040939; and J55150846.

*Primary Examiner*—Carolyn Paden
*Attorney, Agent, or Firm*—Pillsbury Madison & Sutro, LLP

[57] ABSTRACT

Process for flavouring an edible oil by incorporating into a recipient oil flavour substances of which a part has been derived from liquid/liquid extraction, particularly using an ethanol/water mixture of a flavour source liquid, characterized in that another part of the flavour substances has been derived from gas/liquid extraction using an extraction gas which is conducted first through a heated flavour oil and then through a cooler recipient oil.

12 Claims, 1 Drawing Sheet

FLAVORING OF EDIBLE OILS

This application is the national phase of international application PCT/EP96/02844 filed Jun. 26, 1996.

The present invention is concerned with a process for flavouring edible oils. Flavours are used which preferably have been isolated from edible oils.

STATE OF THE ART

The majority of the edible oils are triglyceride oils of natural origin. These oils, obtained by pressing or extracting plant seeds, generally need a refining treatment. The purpose of the refining treatment is the removal of undesired components, which may affect the stability, the taste or the subsequent processing of the oil.

Refining conditions are usually so drastic that all odoriferous substances are removed: off-flavours as well as desired flavours. Although a bland, stable oil was generally the goal of refining, in present times the native flavour of the oil receives a growing appreciation of the consumer. Some oils, such as olive oil, are traditionally appreciated for their flavour. However, also a flavour oil usually needs some refining treatment and this might adversely affect its native flavour.

The organoleptic perception of a natural flavour results from the composed effect of numerous constituting components of the complex flavour mixture. Each of the flavour components suffers in a different way from the refining process. At increased temperature the volatile components disappear by evaporation faster than the less volatile ones.

Therefore the change and the eventual loss of flavour under oil refining conditions delivers a serious problem.

Most unrefined natural oils contain free fatty acids, often at such a high level that the oil is unsuitable for human consumption. Among the various types of olive oils such unedible oil is Lampante oil.

Traditional processes for the removal of free fatty acids comprise alkali neutralisation and steam distillation. Alternatively, according to U.S. Pat. No. 1,371,342 olive oil is deacidified by extraction with ethanol or an ethanol/water mixture. Such extraction process has the advantage over alkali neutralization that no aggressive chemicals are needed and over steam distillation that high temperatures are avoided.

The extract, besides some oil, will mainly contain varying amounts of free fatty acids up to 50 wt. % and even up to 70 wt. %. For this reason the extract when freed from the extraction liquid, is also denoted as "acid oil". Acid oil has often been considered as waste, valued only for the recovery of free fatty acids. The presence of valuable flavour substances in the extract was not recognized.

EP 545 292 describes a process for the liquid/liquid extraction of sterols from butter oil. The butter flavour substances which are extracted too, are recirculated to the extracted source oil.

EP 475 573 teaches how volatile flavour substances can be removed from a flavour rich source oil by a gas/liquid extraction which comprises conducting a gas first through such source oil and subsequently through a cooler recipient oil which absorbs flavour substances from the gas stream.

STATEMENT OF INVENTION

It has now been found that a liquid/liquid extraction process predominantly isolates the non-volatile flavour substances from the source oil, while a gas/liquid extraction process mainly removes the volatile flavour substances from the source oil. Employing either flavour removing process therefore results into a flavoured edible oil with an improper balance of volatile and non-volatile flavour substances: either a major part of the volatile components is lacking or a major part of the non-volatile components.

The present invention provides a process for flavouring an edible oil by incorporating in a recipient oil flavour substances of which a part has been derived from liquid/liquid extraction of a source liquid, characterized in that another part of the flavour substances has been derived from gas/liquid extraction using an extraction gas of the same or another source liquid.

The process enables the independent control of both the volatile flavour substances and the non-volatile flavour substances in the recipient oil.

BRIEF FIGURE DESCRIPTION

For liquid extraction the use of a rotating disc contactor (RDC) is preferred. FIG. 1 gives a schematical view of such equipment. V is the reactor vessel with two pipes A and O connected to the top and two pipes A' and O' connected to the bottom. Inside the reactor vessel of the RDC rotating discs D are found which are attached to a central rotatable shaft S and which extend radially from the shaft. At the wall stationary rings R are attached.

DETAILED DESCRIPTION

Figure 1:
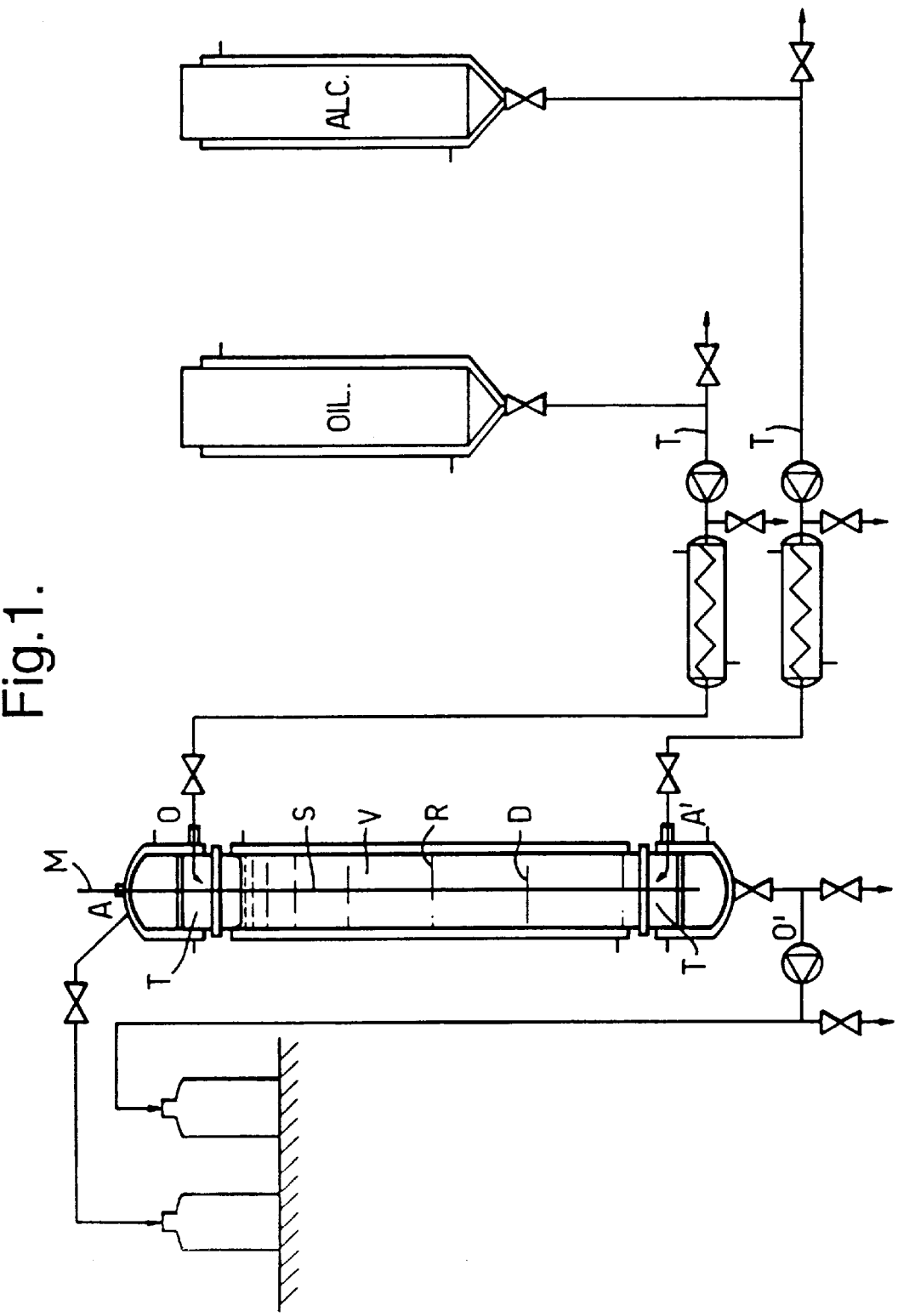

The invention provides a process which is particularly useful for the flavouring of triglyceride oils, particularly olive oil, for which, preferably, cheap refined Lampante oil is used. Refined Lampante oil complies with the severe olive oil regulations for consumption, but, because of its bland taste, it should be flavoured by blending with expensive, flavour-rich extra-virgin, fine or semi-fine olive oil.

According to the invention bland refined Lampante oil can be imparted a surprisingly good flavour while economizing on the above expensive olive oils. The oil which is denoted as recipient oil is flavoured with two types of extracts. One extract is obtained by liquid/liquid extraction and one extract is obtained by gas/liquid extraction. When extracting the source liquid with liquid/liquid extraction the major part of the non-volatile flavour substances will be isolated, while with gas/liquid extraction the major part of the volatile flavour substances will be isolated. The extracts may be added to the recipient oil separately or combined as one preparation. Both extracts are used in such amounts that the resulting flavoured oil contains not only a sufficient amount but also a balanced ratio of volatile as well as non-volatile flavour substances. The ratio volatiles/non-volatiles (v/nv) preferably is in the range of 1:2 to 10:1, more preferably 1:1 to 4:1. Consequently if the flavour needs an increase of non-volatiles flavour substances, more extract of the liquid/liquid extraction is added and if more volatile flavour substances are wanted, more extract of the gas/liquid extraction is added.

Employing the process of the invention makes it surprisingly easy to manipulate the blend flavour using only naturally obtained olive oil extracts.

Obviously, volatile is a relative qualification, but in the context of this specification volatiles are, rather arbitrarily, defined as compounds having a boiling point of 173° C. or less, while the non-volatiles comprise compounds having a boiling point higher than 173° C.

The flavour donating source liquid preferably is an edible flavour oil, particularly a triglyceride oil. Any oil which has an attractive flavour may be selected for use as a source oil. Triglyceride oils which are particularly suited for the process of the invention are olive oil, arachide oil, wallnut oil, soybean oil, sunflower seed oil, rapeseed oil and butter oil. A preferred source oil is olive oil, particularly unrefined Lampante oil, which is a rich flavour source comparable with extra-virgin olive oil.

The liquid/liquid extraction of the source oil may be preceded by any known pre-treatment such as e.g. dry-degumming with a silica absorbens or conditioning with a concentrated (50 wt. %) citric acid solution in order to remove traces of metal such as iron and copper which may act as pro-oxidants, or simmering at a slightly elevated temperature in order to have decomposed destabilizing peroxides.

For the liquid/liquid extraction a suitable extraction liquid is chosen, preferably from the group consisting of lower alcohols such as methanol, propanol, glycerol and, more preferably, ethanol. An effective alcoholic extraction liquid preferably contains some water. A preferred mixture is ethanol containing 0.001–13 wt. % of water. The extraction liquid should be thoroughly contacted with the oil. Although with common mixing equipment an acceptable effect may be obtained, for extraction on industrial scale preferably a liquid/liquid extractor, preferably a so-called rotating disc contactor (RDC, FIG. 1) is used operating according to the counter current principle.

The amount of extraction liquid may vary widely. Preferably the volume ratio extraction liquid:oil is in the range 0.5:1 to 4:1, more preferably 1:1 to 2:1.

The extraction temperature has appeared to be not very critical and can be chosen in a fairly broad range. Suitable temperatures are 5°–60° C. (at atmospheric pressure).

In order to recover ethanol the extracted oil is subjected to a stripping treatment, preferably comprising passing a falling film evaporator and steam stripping as described in the experimental section. The resulting oil is an excellent recipient oil for the flavouring process of the present invention.

The extraction liquid is stripped too from the collected flavour extract, preferably by sparging with nitrogen under reduced pressure, or using a so-called falling film evaporator in order to minimize residence times. Preferred conditions are 50°–90° C. and 0.1–800 mbar. In case of ethanol the stripping step reduces the amount of extraction liquid from 3–10 wt. % to a residue of 0.01–2 wt. %.

The flavour extract does not need further purification and can be employed as such for flavouring. Already a relatively small amount of extract suffices to impart an agreeable flavour to a recipient oil. Because of this low dose the fatty acid level in the flavoured recipient oil will not exceed a level beyond which the acid content of the oil becomes too high.

Alternatively, the flavour extract may be subjected to a further purification treatment, primarily for removing the co-extracted free fatty acids. For that purpose the extract is mixed with a hydrophilic extraction liquid, which preferably is a water-alcohol mixture, more preferably a water-ethanol mixture which contains preferably 20–40 wt. %, more preferably about 25 wt. % of water. By thorough mixing the flavour components will accumulate in the hydrophilic aqueous phase, while the fatty acids will stay predominantly in the lipophilic oily phase. After separation of phases and removal of the alcohol (suitably at about 60° C. and about 80 mbar), the collected hydrophilic extract can be used for oil flavouring purposes.

While a liquid/liquid extraction enables the removal of the major part of the non-volatile flavour substances from the source liquid, the volatile flavour substances of a source oil are preferably extracted using a gas/liquid extraction. For that purpose a suitable inert gas is conducted through a source liquid, usually a flavour oil and then through a cooler recipient liquid. The flavour substances in the carrier gas are deposited in the recipient liquid. The recipient liquid suitably is an oil, the oil to be flavoured or another oil in which the flavour substances accumulate in a high concentration and which will serve as a flavour storage medium.

The recipient liquid may also be a non-oil liquid. A preferred non-oil liquid is the flavour extract of the liquid/liquid extraction, optionally liberated from the excess of fatty acids as described earlier.

Alternatively the gas/liquid extraction is applied in the absence of any recipient liquid. The flavour components may be captured by contacting the gas with a cooled surface, e.g. a condenser on which the flavour substances will condense. Condensation of the flavour substances may occur together with the carrier gas, depending on the condensation temperature of the gas, which is the usual situation when the stripping gas is steam. The condensate is collected and used as flavour extract.

In the context of the present invention a gas/liquid extract is understood to comprise all liquid phases in which flavour substances have been captured which have been released from a source liquid by gas/liquid extraction.

The conditions for gas/liquid extraction are extensively discussed in EP 475 573. Flavour release is enhanced by increase of the temperature of the source liquid. Although normally five extraction hours will suffice, stripping may be continued as long as volatiles substances keep being released to a substantial extent. The nature of the released flavour changes, since the more volatile components will get exhausted first. The skilled man can easily optimize conditions by some "try and find" experimentation. Suitable stripping gases are steam and, preferably, nitrogen. 0.2–2 $m^3$, preferably 1 $m^3$ of stripping gas per kg of oil is a suitable flow.

Flavour extracts may be adjusted by dilution so that flavour can be dosed more accurately.

For liquid/liquid extraction and gas/liquid extraction the same or a different batch of flavour oil may be used. Gas/liquid extraction may follow liquid/liquid extraction, but preferably precedes it. Gas/liquid extraction and liquid/liquid extraction may be applied not only with different batches, but also with different source oils. However, when flavouring olive oil, preferably crude Lampante oil is used as source oil both for gas/liquid extraction and for liquid/liquid extraction.

The flavoured oil can be used as such. But, for having fine-tuned the final flavour and taste the flavoured olive oil is usually blended with other olive oils. Many high quality olive oil brands on sale are blends containing a substantial amount of cheap refined Lampante oil and relatively small amounts of expensive virgin olive oils chosen from the group consisting of extra-virgin olive oil, fine olive oil and semi-fine olive oil. The present invention enables the partial substitution of the expensive virgin olive oils with flavoured olive oils obtained according to the present invention.

The olive oils obtained with use of the invention exhibit a taste which is as good as common olive oil blends. The flavouring process does not necessarily aim at developing an oil which is superior in taste to existing oil blends, but rather at an oil of which the taste is familiar and appreciated by the average olive oil consumer.

Olive oils may contain ethanol. Very small concentrations (less than 2 ppm) have a natural origin. Large amounts 5 wt. % ethanol and more are derived from deliberately mixing olive oil with ethanol as part of a composition. Olive oil samples which show an ethanol content up to 1 wt. % but with a minimum content of at least 2 ppm, preferably at least 10 ppm, more preferably at least 50 ppm of ethanol are not known. They are the product of the present process when ethanol has been used as extraction liquid and is left in small residual amounts. Edible Olive oil blends containing ethanol in the indicated concentrations therefore form part of the invention.

Commercial olive oil contains some water. Up to 0.4 wt. % in dissolved form. Beyond that amount dispersed in the oil. Also the olive oil of the invention is not free of water.

The invention is illustrated in the following experimental section:

GENERAL

For liquid/liquid extraction advantageously a rotating disc contactor (RDC) is employed (FIG. 1). In such extractor the oil is fed at the top through inlet O and the extraction liquid is fed at the bottom of the reactor through inlet A'. The two streams move in opposite directions and when passing the rotating discs they get involved in a plug flow interaction, where extraction takes place. Finally the two phases oil and ethanol separate and are tapped at the bottom and the top of the reactor through outlets O' and A respectively. Optionally, the flows are allowed to recirculate in order to enhance the extraction (not shown in the figure).

Since flavour is a relative quality, for all flavour assessments a reference oil is used. This oil is a common, good tasting, generally appreciated olive oil which is on sale in Greece. The reference oil is chosen from the group comprising virgin olive oils and pure olive oil blends.

The abbreviation OV means olive oil.

PREPARATION 1

Liquid/Liquid Extraction of Olive Oil

A batch of crud e filtered Lampante olive oil was washed with 0.2 wt. % (on oil) of a 50 wt. % citric acid solution, freed from air by sparging with nitrogen and stored under nitrogen. The oil was fed to a (8 liter) RDC together with sugar fermented ethanol in a ratio ethanol/oil=18:10. The ethanol was freed from dissolved air and contained 8.3 wt. % of water. Shaft speed was about 300 rpm. Both the oil and the ethanol were kept at 50° C. Their flows were adjusted to about 4 liters per hour.

By measuring the level of residual free fatty acids (FFA) in the oil the progress of the extraction was monitored. The flows were recirculated until a steady state was achieved characterized by a reduction of the FFA content in the oil from an initial 5 wt. % to a constant 0.1 wt. %. After six hours of extraction both the extracted oil and the ethanol extract were collected and stored under nitrogen.

The extracted oil contained about 10 wt %. of dissolved ethanol, which was recovered by continuous evaporation in a falling film evaporator (90° C. at 100 mbar) and subsequent steam stripping until <10 ppm ethanol. The extracted oil was steam stripped under very mild conditions (90° C. at 5 mbar) using 1.5 $m^3$ of steam per kg of oil (oil C, see Table I). The resulting mild refined oil is an excellent recipient oil containing less than 1 wt. % of free fatty acids. In such oil a flavour carrying extraction gas can deposit its flavour substances.

Besides aroma substances the ethanol extract contained mainly FFA, partial triglycerides, antioxidants and about 10 wt% of dissolved oil. The ethanol was film evaporated (100° C. at 100 mbar) using a parallel falling film evaporator. The oily flavour extract C (see Table I) still contained 2 wt. % (20000 ppm) of ethanol and the major part of the non-volatile olive oil flavour substances.

PREPARATION 2

Gas/Liquid Extraction of Lampante Oil

The flavour source liquid is the crude filtered Lampante oil which has been washed with a citric acid solution according to preparation 1. The recipient oil is a mild refined Lampante oil. This oil is obtained by first extracting with ethanol using the method described in preparation 1 and then subjecting the extracted oil during 3 hours to deodorization at 120° C. and 10 mbar with 1 $m^3$ of steam per kg oil During 6 hours, 0.4 $Nm^3$ nitrogen per hour was sparged through 20 kg of the source oil at 55° C. and 75 mbar. The flavour enriched nitrogen was then sparged through 10 kg of the recipient oil at 20° C. and atmospheric pressure resulting into flavoured oil D (see Table II). The reference oil is a fine grade virgin olive oil on sale in Greece.

PREPARATION 3

Preparation of Flavoured Condensate

A vessel was partially filled with 2 kg of crude Lampante oil and evacuated. The oil was heated to 60°0 C. and 39.6 g steam per hour was passed through the oil under 13.8 mbar. The flavour carrying steam was conducted to a cool trap containing dry ice where it condensed to a flavour substances containing condensate. After 5 hours the process was terminated and the frozen condensate allowed to melt affording 204 g of aqueous flavour concentrate. Aroma level: 564550 ppb (cfr. crude Lampante oil: 54294 ppb). The condensate is used as a gas/liquid extract for olive oil blending according to the present invention. After the desired amount of extract has been added to the olive oil the mixture is stirred vigorously and the water phase separated by centrifugation as described in example 4. Tasting the product may guide in finding the proper amount of condensate for the preparation of an olive oil blend.

TABLE I

COMPOSITION OF OILS AND EXTRACT

|  | Oils | | Extract |
| --- | --- | --- | --- |
|  | Start | C | C |
| FFA (wt. %) | 4.7 | 0.94 | 17 |
| Saturated aldehydes (ppb) | 19100 | 2400 | 55400 |
| Unsaturated aldehydes (ppb) | 20900 | 5100 | 82000 |
| Alcohols (ppb) | 5400 | 500 | 36000 |
| Esters (ppb) | 800 | 300 | 10700 |
| Acids (ppb) | 15200 | 900 | 81300 |
| after film evaporation | | | |
| Ethanol (ppm) | 1.01 | 385 | 20000 |
| after steam stripping of extracted oil | | | |
| Ethanol (ppm) | | 5.4 | |

Start oil: Crude Lampante oil after citric acid treatment

TABLE II

Composition of refined Lampante oil
after sparging with flavour enriched nitrogen

| Components | Recipient oil (1) | Oil D | Reference oil (1) |
|---|---|---|---|
| Saturated aldehydes (ppb) | 299 | 42339 | 22689 |
| Unsaturated aldehydes (ppb) | 2508 | 18236 | 31289 |
| Alcohols | 21 | 4973 | 6686 |
| Esters (ppb) | 6 | 684 | 2620 |
| Acids (ppb) | 9 | 10851 | 3117 |
| Various (ppb) | 187 | 404 | 3741 |
| Totals | 3030 | 77487 | 70142 |
| Volatiles (vol) | 375 | 61736 | 36121 |
| Non-volatiles (non-vol) | 2655 | 15751 | 34021 |
| Vol/Non-vol ratio | 0.1 | 3.9 | 1.1 |

(1) Recipient oil: Ethanol extracted and deodorized Lampante oil of preparation 1
Reference oil: a virgin olive oil (fine grade) on sale in Greece.

EXAMPLE 1

OV Blends Enriched by a Gas/liq Flavour Extract and by a Liq/liq Flavour Extract Three olive oil blends A1, A2 and A3 have been prepared with a composition according to Table IV. Besides regular olive oil blend ingredients as are commonly refined Lampante oil (NBD OV), fine and semi-fine olive oil, also a liquid/liquid extract and a gas/liquid extract according to the compositions mentioned in Table IV have been used. The blends mainly differ in their content of liquid/liquid extract. For comparison a reference blend is selected. The reference blend is a common good tasting, generally appreciated olive oil blend which is on sale in Greece. All blends have been organoleptically assessed by 11 panellists against the reference blend. The panel assigned a score taken from Table III below. The comparison scores in Table IV tell that blends A1 and A2 containing only 20 wt. % of fine and semi-fine olive oil are appreciated as good as or even better than the reference blend which contains as much as 35 wt. % of fine and semi-fine OV. The comparison scores agree with the ratio's of volatiles/non-volatiles.

TABLE III

Flavour scores when comparing a test blend with a reference oil

| | |
|---|---|
| −2 | Largely inferior |
| −1 | Inferior |
| 0 | Just as good |
| +1 | Better |
| +2 | Much better |

TABLE IV

Olive oil blends enriched by a gas/liq flavour extract
and by a liq/liq flavour extract

| Components (wt. %) | Blend A1 | Blend A2 | Blend A3 | Reference blend |
|---|---|---|---|---|
| NBD OV | 65 | 65 | 64 | 65 |
| Fine OV | 15 | 15 | 15 | 27 |
| Semi-fine OV | 5 | 5 | 5 | 8 |

TABLE IV-continued

Olive oil blends enriched by a gas/liq flavour extract
and by a liq/liq flavour extract

| Components (wt. %) | Blend A1 | Blend A2 | Blend A3 | Reference blend |
|---|---|---|---|---|
| Oil D[1] | 2.3 | 2.3 | 2.3 | 0 |
| Recipient oil[2] | 12.7 | 12.7 | 12.7 | 0 |
| Extract C[3] | 0.1 | 0.3 | 1.0 | 0 |
| Vol/non-vol ratio | 3.0 | 2.2 | 1.8 | 2.8 |
| Comparison score | +1 | 0 | −1 | |

[1]Flavoured oil of preparation 2
[2]Recipient oil: Ethanol extracted and deodorized Lampante oil of preparation 2
[3]Liquid/liquid extract of preparation 1

EXAMPLE 2

Olive Oil Blends Enriched by a Gas/Liq Flavour Extract and by a Liq/Liq Flavour Extract Three olive oil blends B1, B2 and B3 have been prepared with a composition according to Table V. Besides regular olive oil blend ingredients as are commonly refined Lampante oil (NBD OV), fine and semi-fine olive oil, also a liquid/liquid extract and a gas/liquid extract according to the compositions mentioned in Table V have been used. The blends mainly differ in that B1 contains no gas/liquid extract and B2 contains no liquid/liquid extract. Blend B3 contains both extracts.

All blends have been organoleptically assessed in the way as described in example 1. Table V shows that blend B3 containing both abstracts but only 21 wt. % of fine and semi-fine olive oil is appreciated better than the reference blend (same as example 1) which contains as much as 35 wt. % of fine and semi-fine OV. The comparison scores agree with the ratio's of volatiles/non-volatiles.

TABLE V

OV blends enriched by a gas/liq flavour extract and
by a liq/liq flavour extract

| Components (wt. %) | Blend B1 | Blend B2 | Blend B3 | Reference blend |
|---|---|---|---|---|
| NBD OV | 65 | 65 | 65 | 65 |
| Fine OV | 13 | 13 | 13 | 27 |
| Semi-fine OV | 8 | 8 | 8 | 8 |
| Oil D[1] | 0 | 2 | 2 | 0 |
| Recipient oil[2] | 13.5 | 12 | 11.5 | 0 |
| Extract C[3] | 0.5 | 0 | 0.5 | 0 |
| Vol/non-vol ratio | 1.9 | 2.4 | 3.2 | 2.8 |
| Comparison score | −1 | 0 | +2 | |

[1]Flavoured oil of preparation 2
[2]Recipient oil: Ethanol extracted and deodorized Lampante oil of preparation 2
[3]Liquid/liquid extract of preparation 1

TABLE VI

OV blends enriched by a gas/liq flavour extract and
by a liq/liq flavour extract

| Components (wt. %) | Blend C1 | Blend C2 | Blend C3 | Reference blend |
|---|---|---|---|---|
| NBD OV | 50 | 50 | 50 | 50 |
| Fine OV | 18 | 18 | 18 | 38 |
| Semi-fine OV | 12 | 12 | 12 | 12 |

TABLE VI-continued

OV blends enriched by a gas/liq flavour extract and
by a liq/liq flavour extract

| Components (wt. %) | Blend C1 | Blend C2 | Blend C3 | Reference blend |
|---|---|---|---|---|
| Oil D[1] | 9 | 9 | 0 | 0 |
| Recipient oil[2] | 11 | 10 | 19 | 0 |
| Extract C[3] | 0 | 1.0 | 1.0 | 0 |
| Vol/non-vol ratio | 3.0 | 3.8 | 1.9 | 3.2 |
| Comparison score | 0 | +2 | −2 | |

[1]Flavoured oil of preparation 2
[2]Recipient oil: Ethanol extracted and deodorized Lampante oil of preparation 2
[3]Liquid/liquid extract of preparation 1

EXAMPLE 3

Olive Oil Blends Enriched by a Gas/liq Flavour Extract and by a Liq/liq Flavour Extract Three olive oil blends C1, C2 and C3 have been prepared with a composition according to Table VI. Besides regular olive oil blend ingredients as are commonly refined Lampante oil (NBD OV), fine and semi-fine olive oil, also a liquid/liquid extract and a gas/liquid extract according to the compositions mentioned in Table VI have been used. Compared with previous examples the three blends contain much less traditional ingredients. The blends mainly differ in that C3 contains no gas/liquid extract and C1 contains no liquid/liquid extract. Blend C2 contains both extracts. All blends have been organoleptically assessed as described in example 1. Table VI shows that blend C2 containing only 30 wt. % of fine and semi-fine olive oil is appreciated better than the reference blend which is another common, good tasting, generally appreciated olive oil blend which is on sale in Greece, which contains as much as 50 wt. % of fine and semi-fine OV. The comparison scores agree with the ratio's of volatiles/non-volatiles.

EXAMPLE 4

Gas Flavoured Liq/Liq Extract for Olive Oil Blending

A vessel was partially filled with 2 kg of crude Lampante oil and then evacuated. After the oil had been heated to 55° C., for two hours 48 l/h of oxygen free nitrogen was passed through the oil under 500 mbar. The flavour carrying gas was conducted to a recipient vessel and under atmospheric pressure and at 18° C. passed through 700 g of a non-oil stirred recipient liquid being the extract C according to preparation 1 which absorbed the flavour substances from the gas stream resulting in a flavoured flavour extract.

The gas flavoured flavour extract was blended both with a regular refined Lampante oil and with a Lampante oil which was previously mild refined by extraction with ethanol and low temperature deodorization according to preparation 2. After the desired amount of extract had been added to the refined Lampante oil, the mixture was stirred vigorously to allow migration of the flavour substances to the oil. The water phase was separated by centrifugation. For comparison the blending was repeated with extract C which had not been flavoured with a flavour carrying gas. The flavoured blends had been submitted to a taste panel (n=6) which for assigning had to select a number from 1–10 from a range, here 10 is the score of a good quality fine-grade virgin olive oil.

The average scores in Tables VII and VIII show that the best flavour results are obtained when the used liquid/liquid extract has been supplemented with flavours transmitted by gas (gas/liquid extract).

For blending the use of 10 wt. % of extract apparently gives the best results.

TABLE VII

Assessed Oil
TASTE SCORE
Fine virgin olive oil
10
Liq/liq extract blended
with a regularly refined Lampante Oil

| Extract wt. % | extract flavoured with gas/liq extraction | extract not flavoured with gas/liq extraction |
|---|---|---|
| 0.5 | 1 | 1 |
| 3.0 | 6 | 2 |
| 10 | 7 | 2 |
| 15 | 5 | 2 |
| 20 | 5 | 1 |

TABLE VIII

Assessed Oil
TASTE SCORE
Fine virgin olive oil
10
Liq/liq extract blended
with a mild refined Lampante oil

| Extract wt. % | extract flavoured with gas/liq extraction | extract not flavoured with gas/liq extraction |
|---|---|---|
| 0.5 | 1 | 1 |
| 3.0 | 6 | 2 |
| 10 | 8 | 3 |
| 15 | 7 | 2 |
| 20 | 5 | 1 |

We claim:

1. Process for flavouring an edible oil which comprises incorporating into a recipient edible oil, non-volatile flavour substances derived from liquid/liquid extraction of a flavour source liquid and also incorporating into said recipient oil volatile flavour substances derived from gas/liquid extraction using an extraction gas to extract volatile flavour substances from the same or another source liquid.

2. Process according to claim 1, wherein the flavour substances derived from gas/liquid extraction are incorporated into the recipient oil using a food-grade liquid in which the extraction gas has deposited flavour substances.

3. Process according to claim 2, wherein the food-grade liquid is a condensate of the flavour carrying extraction gas.

4. Process according to claim 1, wherein the recipient oil receives the flavour substances derived from gas/liquid extraction by direct absorption from the flavour carrying extraction gas.

5. Process according to claim 1, wherein the flavour substances containing source liquid is selected from the group consisting of olive oil, arachide oil, wallnut oil, soybean oil, sunflower seed oil, rapeseed oil and butter oil.

6. Process according to claim 5, wherein the edible oil is Lampante olive oil.

7. Process according to claim 6, wherein the liquid/liquid extract has been obtained by extracting the edible oil with an ethanol/water mixture, containing 0.001–13 wt. % of water.

8. Process according to claim 7, wherein the resulting flavoured edible oil contains volatile as well as non-volatile flavour substances in a ratio of 1:2 to 10:1.

9. Process for flavouring an edible oil according to claim 8, wherein the recipient oil is a refined Lampante oil.

10. An edible olive oil blend prepared by the process according to claim 1 containing up to a maximum of 1 wt. % of ethanol and a minimum of at least 50 ppm of ethanol.

11. Foodstuff prepared with an oil blend according to claim 10.

12. A process for preparing a flavoured edible oil which comprises adding to refined Lampante oil, non-volatile flavour substances derived by ethanol/water extraction of olive oil and volatile flavour substances derived by gas/liquid extraction of olive oil, the resulting flavoured edible oil containing volatile to non-volatile flavour substances in a ratio of 1:2 to 10:1.

* * * * *